No. 896,902. PATENTED AUG. 25, 1908.
J. A. DYBLIE.
TIRE PUMP.
APPLICATION FILED JAN. 15, 1908.
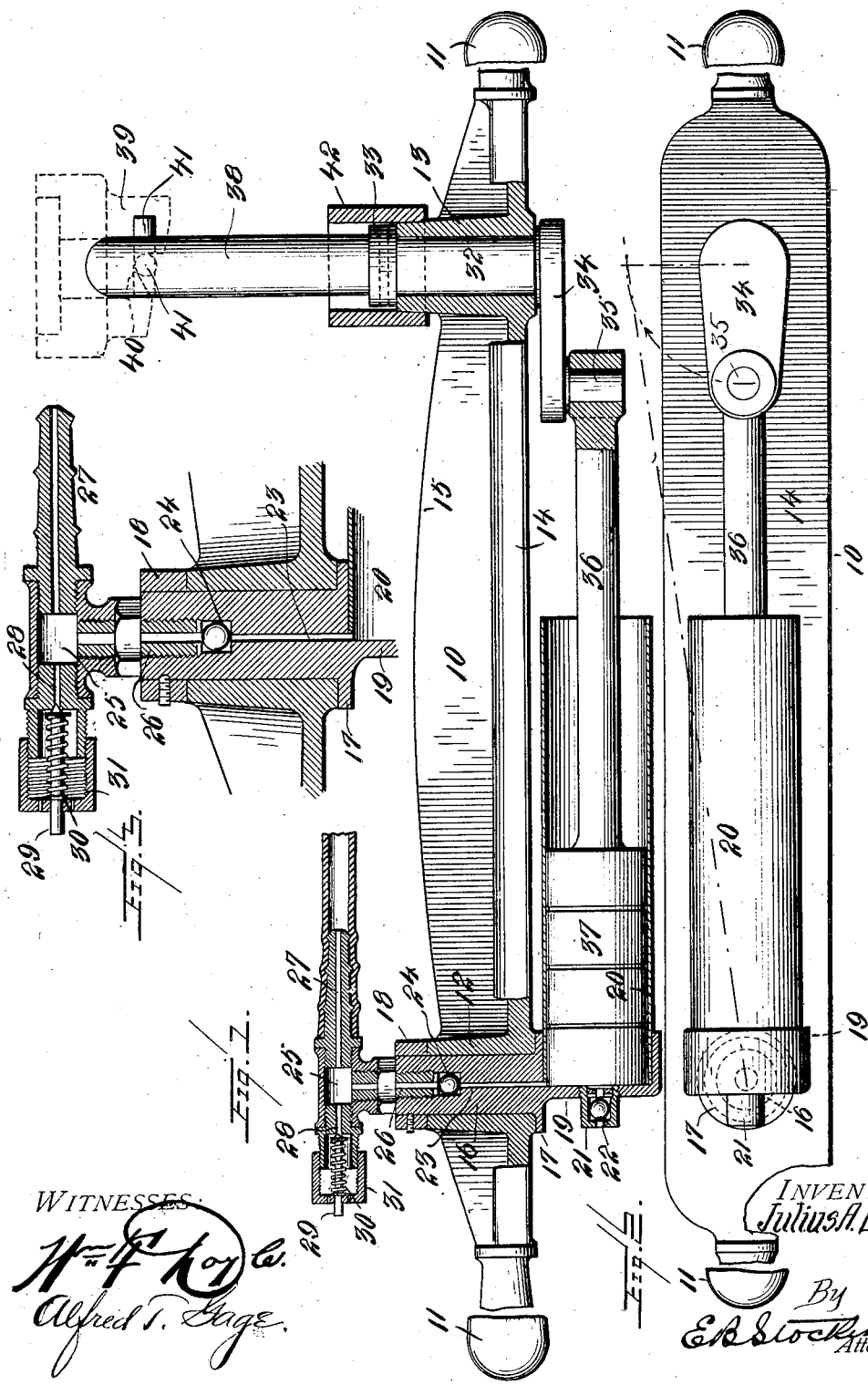
WITNESSES
INVENTOR
Julius A. Dyblie.
By
E. B. Stocking
Attorney

UNITED STATES PATENT OFFICE.

JULIUS A. DYBLIE, OF JOLIET, ILLINOIS.

TIRE-PUMP.

No. 896,902.   Specification of Letters Patent.   Patented Aug. 25, 1908.

Application filed January 15, 1908. Serial No. 410,945.

*To all whom it may concern:*

Be it known that I, JULIUS A. DYBLIE, citizen of the United States, residing at Joliet, county of Will, and State of Illinois, have invented certain new and useful Improvements in Tire-Pumps, of which the following is a specification, reference being had therein to the accompanying drawing.

This invention relates to a tire pump, and particularly to a structure adapted to be driven from the moving part of a motor vehicle.

The invention has for an object to provide a novel and improved construction of pump adapted to be held in the hands of the operator, and having a frame with pivotal bearings at its opposite ends for the driving shaft and cylinder with an extension of said shaft for attachment or connection with a moving part of the driving mechanism of an automobile.

A further object of the invention is to provide an improved arrangement of inlet and outlet valves from the cylinder with a safety valve so arranged as to govern the pressure which may be applied to the tire from the pump.

Other and further objects and advantages of the invention will be hereinafter set forth and the novel features thereof defined by the appended claims.

In the drawing:—Figure 1 is a longitudinal section of the pump with parts in elevation; Fig. 2 is a front elevation thereof; and Fig. 3 is an enlarged section of the valved connections.

Like numerals refer to like parts in the several views of the drawing.

The numeral 10 designates a frame or bar comprising the body of the pump which is provided at each end with a handle 11 to be grasped by the operator, and with the bearing 12 for the cylinder at one end and the bearing 13 for the crank shaft at the opposite end thereof. The front piece 14 of this frame is plane, while the rear face thereof is provided with the strengthening rib 15 to impart the necessary rigidity to the parts.

Within the bearing 12 the cylinder bearing 16 is disposed and provided with the flange 17 at one end abutting against the frame, while the opposite end is retained in position by the set nut 18 secured thereto. This bearing is provided with the cupped portion 19 adapted to receive the cylinder 20 extending longitudinally of the frame. The portion 19 is also provided with the valve cage 21 adapted to carry a valve of any desired character for instance, a ball valve 22, as shown in Fig. 1. The inner end of the cylinder 20 communicates with the passage 23 through the bearing 16 which passage terminates in the valve chamber 24 which may contain the ball valve, as shown. Into the end of this chamber 24 the hose connector 25 is secured by means of the threaded shank 26. One end of this connector is provided with the tubular member 27 over which the connecting hose extending to the tire to be inflated may be placed. This member is secured into one end of the connector and into the opposite end thereof the safety valve 28 is secured, as shown in Fig. 3. This valve comprises the spring pressed stem 29 held closed under tension by the spring 30, and the tension of this spring is adjusted by means of the cap 31 threaded upon the exterior of the valve body 28, as shown. By this means the maximum pressure to be applied at any time may be governed and regulated according to the conditions of use.

At the opposite end of the frame from the cylinder connection the driving shaft 32 is mounted in the bearing 13 and held against lateral movement by the collar 33 secured thereon. This shaft is provided with the crank arm 34 pivotally connected at 35 to the outer end of the piston rod 36 which at its opposite end carries the solid piston 37 within the cylinder 20. The driving shaft 32 is extended at its inner end 38 and may be provided with any desired connecting means to engage the driven part of a motor vehicle so as to utilize the engine power thereof for the pumping action. In the present illustration the pump is shown as applied to the construction of clutch ordinarily used upon a machine such as the Cadillac automobile. This clutch is designated by dotted lines 39 and provided with a seat 40 with which a pin or other projection 41 upon the crank shaft is adapted to engage so that the rotation of the clutch member is transmitted to the driving shaft. When so applied the end of the bearing 13 may be provided with a ferrule or collar 42 fitting the hole in the frame on a side crank car through which the starting crank is applied.

In the operation of the invention it will be seen that it is only necessary to insert the driving shaft of the pump into clutched relation with a moving member of the automobile, while the frame is held by the opposite handles after having been previously attached to the tire by the usual tube or hose for that purpose. The pumping action is thus effected by the power of the machine until a pressure is reached equal to that for which the safety valve has been set when this valve opens and allows the escape at which time the driving shaft can be withdrawn from the clutch of the machine and the operation of the pump immediately stopped. It will be seen that the pump presents a simple structure occupying but little room and which can be readily handled and applied by the operator, while the pivotal mounting of the cylinder and driving shaft in line at opposite ends of the frame permit a rapid operation with the minimum of vibration so that the tool may be easily held in position. The invention therefore presents a simple, economically constructed and very efficient pump especially adapted for use in connection with automobile tires and adapted to be driven from the mechanism thereof.

Having described my invention and set forth its merits, what I claim and desire to secure by Letters Patent is:—

1. In a tire pump, a handle bar provided with bearings at opposite ends, a cylinder pivoted in one of said bearings, a crank shaft pivoted in the opposite bearing, and a piston rod disposed in said cylinder and carried by said crank shaft.

2. In a tire pump, a handle bar provided with bearings at opposite ends, a cylinder pivoted in one of said bearings, a crank shaft pivoted in the opposite bearing, a piston rod disposed in said cylinder and carried by said crank shaft, and an extended end from said crank shaft provided with connecting means for receiving power from a driven member.

3. In a tire pump, a handle bar provided with bearings at opposite ends, a cylinder pivoted in one of said bearings, a crank shaft pivoted in the opposite bearing, a piston rod disposed in said cylinder and carried by said crank shaft, an intake valve disposed at the pivoted end of said cylinder, and a hose connection carried by the cylinder bearing at the opposite side of the handle from said cylinder.

4. A tire pump comprising a frame having bearings at opposite ends, handles extended therefrom, an apertured cylinder bearing mounted in one of said bearings and provided with a cup at one end carrying a cylinder, a crank shaft carried by the opposite frame bearing, and a piston in said cylinder connected to said shaft.

5. A tire pump comprising a frame having bearings at opposite ends, handles extended therefrom, an apertured cylinder bearing mounted in one of said bearings and provided with a cup at one end carrying a cylinder, a crank shaft carried by the opposite frame bearing, a piston in said cylinder connected to said shaft, an inlet valve carried by said cup, a valve disposed within a valve recess of the apertured bearing, and a hose connection mounted in said recess.

6. A tire pump comprising a frame having bearings at opposite ends, handles extended therefrom, an apertured cylinder bearing mounted in one of said bearings and provided with a cup at one end carrying a cylinder, a crank shaft carried by the opposite frame bearing, a piston in said cylinder connected to said shaft, an inlet valve carried by said cup, a valve disposed within a valve recess of the apertured bearing, a hose connection mounted in said recess, a spring pressed valve disposed within the discharge from said connection, and means for varying the tension of said spring.

7. In a tire pump, a handle bar provided with elongated bearings at its opposite ends, handles extended therefrom, a cylinder, a tubular pivot for said cylinder having an enlarged valve recess therein and a cup to receive said cylinder, a flange disposed at one end of said tubular bearing, and a retaining ring at the opposite end thereof.

8. In a tire pump, a handle bar provided with elongated bearings at its opposite ends, handles extended therefrom, a cylinder, a tubular pivot for said cylinder having an enlarged valve recess therein and a cup to receive said cylinder, a flange disposed at one end of said tubular bearing, a retaining ring at the opposite end thereof, a valve ball disposed in said recess, a hose connection mounted in the recess to retain the ball therein, and a casing mounted upon said cup and carrying a ball valve.

9. In a tire pump, a handle bar provided with bearings at its opposite ends, handles extended therefrom, a cylinder pivoted in one of said bearings, an extended crank shaft provided at one end with a power connecting device, and a piston in said cylinder and carried by said crank shaft.

10. In a tire pump, a bar provided with bearings at opposite ends, handles extended therefrom, an oscillating cylinder mounted in one of said bearings and having an intake valve, a solid piston disposed in said cylinder, and a driving shaft mounted in the opposite bearing and having a crank arm connected to said piston.

11. In a tire pump, a bar provided with bearings at opposite ends, handles extended therefrom, an oscillating cylinder mounted in one of said bearings and having an intake valve, a solid piston disposed in said cylinder, a driving shaft mounted in the opposite bearing and having a crank arm connected to said piston, a hose connection, and a safety valve connected with said connection and adjustable to determine the pressure upon the hose connection therefrom.

In testimony whereof I affix my signature in presence of two witnesses.

JULIUS A. DYBLIE.

Witnesses:
　CHAS. T. MASON,
　F. M. CHEESEMAN.